US012803755B2

(12) United States Patent
Zhang et al.

(10) Patent No.: US 12,803,755 B2
(45) Date of Patent: Nov. 17, 2026

(54) DATA TRANSMISSION METHOD AND APPARATUS, AND STORAGE MEDIUM AND PROGRAM PRODUCT

(71) Applicant: ZTE CORPORATION, Shenzhen (CN)

(72) Inventors: Wanchun Zhang, Shenzhen (CN); Gaopeng Du, Shenzhen (CN); Feng Wu, Shenzhen (CN); Wei Si, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 283 days.

(21) Appl. No.: 18/713,884

(22) PCT Filed: Nov. 8, 2022

(86) PCT No.: PCT/CN2022/130603
§ 371 (c)(1),
(2) Date: May 28, 2024

(87) PCT Pub. No.: WO2023/103683
PCT Pub. Date: Jun. 15, 2023

(65) Prior Publication Data

US 2024/0356710 A1 Oct. 24, 2024

(30) Foreign Application Priority Data

Dec. 9, 2021 (CN) ......................... 202111498509.X

(51) Int. Cl.
*H04L 5/00* (2006.01)
*H04W 36/00* (2009.01)
*H04W 76/15* (2018.01)

(52) U.S. Cl.
CPC .......... *H04L 5/0053* (2013.01); *H04W 76/15* (2018.02)

(58) Field of Classification Search
CPC ............ H04W 76/15; H04W 36/0069; H04W 36/00692; H04L 5/0053
See application file for complete search history.

(56) References Cited

U.S. PATENT DOCUMENTS

2013/0072182 A1* 3/2013 Jung .................... H04W 24/10 455/422.1
2016/0309319 A1* 10/2016 Gao ..................... H04W 48/20
(Continued)

FOREIGN PATENT DOCUMENTS

CN 110662213 A 1/2020
CN 111432419 A 7/2020
(Continued)

OTHER PUBLICATIONS

3GPP Technical Specification Group Radio Access Network. "Discussion on gNB-eNB interface setup," 3GPP TSG-RAN WG3 Meeting #96, R3-171606, May 2017, pp. 1-2.
(Continued)

*Primary Examiner* — Kent Krueger
(74) *Attorney, Agent, or Firm* — Vivacqua Crane, PLLC

(57) ABSTRACT

Disclosed are a data transmission method and apparatus, a storage medium, and a program product. The data transmission method may include: controlling the first OP module to create a first media processing module; acquiring second identification information of a second NR base station, and determining a deployment mode between the first NR base station and the second NR base station according to the second identification information, a second OP module is configured in the second NR base station; generating target identification information according to the deployment mode, generating control signaling according to the target identification information, and sending the control signaling to the second NR base station, such that the second OP module creates a second media processing module accord-
(Continued)

ing to the control signaling; and controlling, according to the deployment mode, the first media processing module to transmit data to the second media processing module.

20 Claims, 10 Drawing Sheets

(56) References Cited

U.S. PATENT DOCUMENTS

| | | | | |
|---|---|---|---|---|
| 2018/0132210 | A1* | 5/2018 | Rico Alvarino | H04L 5/005 |
| 2019/0045408 | A1* | 2/2019 | Kim | H04W 76/22 |
| 2020/0389531 | A1 | 12/2020 | Lee et al. | |
| 2021/0266870 | A1 | 8/2021 | Bhandari et al. | |
| 2022/0085950 | A1 | 3/2022 | Yang et al. | |
| 2023/0379113 | A1* | 11/2023 | Park | H04L 5/0023 |

FOREIGN PATENT DOCUMENTS

| | | | |
|---|---|---|---|
| EP | 3065430 | A1 | 9/2016 |
| JP | 2020523808 | A | 8/2020 |
| JP | 2021533600 | A | 12/2021 |
| WO | 2020192387 | A1 | 10/2020 |

OTHER PUBLICATIONS

European Patent Office. Extended European Search Report for EP Application No. 22903106.7, mailed Feb. 18, 2025, pp. 1-12.

Industrial Property Cooperation Center (IPCC). Search Report for JP Application No. 2024-531493 and English translation, mailed Feb. 28, 2025, pp. 1-50.

Japan Patent Office. Notice of Reasons for Refusal for JP Application No. 2024-531493 and English translation, mailed Feb. 28, 2025, pp. 1-6.

International Searching Authority. International Search Report and Written Opinion for PCT Application No. PCT/CN2022/130603 and English translation, mailed Dec. 14, 2022, pp. 1-9.

* cited by examiner

DATA TRANSMISSION METHOD AND APPARATUS, AND STORAGE MEDIUM AND PROGRAM PRODUCT

CROSS-REFERENCE TO RELATED APPLICATION

This application is a national stage filing under 35 U.S.C. § 371 of international application number PCT/CN2022/130603, filed Nov. 8, 2022, which claims priority to Chinese patent application No. 202111498509.X, filed Dec. 9, 2021. The contents of these applications are incorporated herein by reference in their entirety.

TECHNICAL FIELD

The present disclosure relates to dual connectivity in the communication field, and more particularly, to a data transmission method and apparatus, a storage medium, and a program product.

BACKGROUND

New Radio-Dual Connectivity (NR-DC) includes a dual-connectivity configuration of low frequency and low frequency in terms of frequency bands. This means that one physical NR station operates as a low frequency cell, and the other physical NR station also operates as a low frequency cell. NR-DC also includes a dual-connectivity configuration of low frequency and high frequency in terms of frequency bands, i.e., one physical NR station operates as a low frequency cell, and the other physical NR station operates as a high frequency cell. Different operators have different deployment modes for low frequency and high frequency under the two NR-DC architectures, requiring equipment manufacturers to adopt various schemes for implementation.

In related technologies, there are mainly three integration methods for the two NR-DC architectures. For example, there are three scenarios for the dual-connectivity configuration of low frequency and high frequency in terms of frequency bands: the NR-DC inter-station non-co-frame scenario, the NR-DC intra-station co-frame co-logical-station scenario, and the NR-DC intra-station co-frame non-co-logical-station scenario. Equipment manufacturers need to recognize the differences among these three deployment scenarios of NR-DC, e.g., differences in control signaling and media data communication. This results in complex hardware deployment, a heavy workload for the development of Operation Process (OP) modules in the three deployment scenarios, high maintenance costs of software versions, unsatisfactory performance, and low efficiency.

SUMMARY

The following is a summary of the subject matter set forth in this description. This summary is not intended to limit the scope of protection of the claims.

Embodiments of the present disclosure provide a data transmission method and apparatus, a storage medium, and a program product.

In accordance with a first aspect of the present disclosure, an embodiment provides a data transmission method, applied to a first NR base station, a first OP module is configured in the first NR base station, the data transmission method including: controlling the first OP module to create a first media processing module; acquiring second identification information of a second NR base station, and determining a deployment mode between the first NR base station and the second NR base station according to the second identification information, a second OP module is configured in the second NR base station; generating target identification information according to the deployment mode, generating control signaling according to the target identification information, and sending the control signaling to the second NR base station, such that the second OP module creates a second media processing module according to the control signaling; and controlling, according to the deployment mode, the first media processing module to transmit data to the second media processing module.

In accordance with a second aspect of the present disclosure, an embodiment provides a data transmission method, applied to a second NR base station, the data transmission method including: receiving control signaling sent by a first NR base station, the control signaling carries target identification information, and the target identification information is generated by the first NR base station according to a deployment mode between the first NR base station and the second NR base station; creating a second media processing module according to the control signaling; determining the deployment mode between the second NR base station and the first NR base station according to the target identification information; and controlling, according to the deployment mode, the second media processing module to perform data distributing.

In accordance with a third aspect of the present disclosure, an embodiment provides a data transmission apparatus, including: a memory, a processor, and a computer program stored in the memory and executable by the processor, the computer program, when executed by the processor, causes the processor to implement the data transmission method described above.

In accordance with a fourth aspect of the present disclosure, an embodiment provides a computer-readable storage medium storing computer-executable instructions which, when executed by a processor, causes the processor to implement the data transmission method described above.

In accordance with a fifth aspect of the present disclosure, an embodiment provides a computer program product, including a computer program or computer instructions stored in a computer-readable storage medium. The computer program or the computer instructions, when executed by a processor of a computer device, causes the computer device to implement the data transmission method described above.

Additional features and advantages of the present disclosure will be set forth in the description which follows, and in part will be apparent from the description, or may be learned by the practice of the present disclosure. The objects and other advantages of the present disclosure can be realized and obtained by the structures particularly pointed out in the description, claims, and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, but are not intended to limit the technical schemes of the present disclosure.

DETAILED DESCRIPTION

Figure 1:
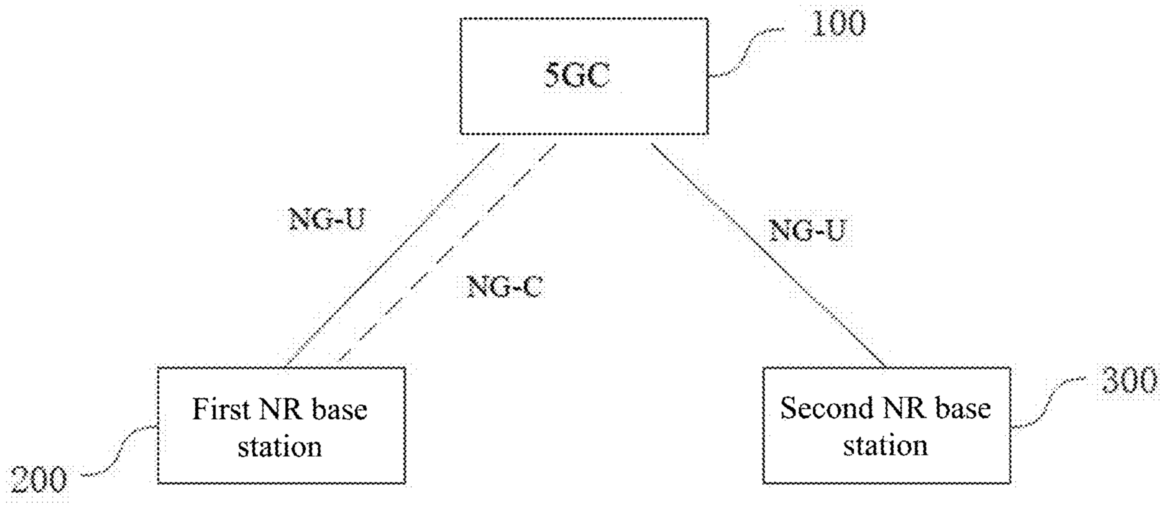
FIG. 1 is a schematic diagram of an NR-DC architecture configured for executing a data transmission method according to an embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although logical orders have been shown in the flowcharts, in some cases, the steps shown or described may be executed in an order different from the orders as shown in the flowcharts. In the specification, claims, and the description of the accompanying drawings, the term "a plurality of" (or multiple) means at least two, the term such as "greater than", "less than", "exceed" or variants thereof prior to a number or series of numbers is understood to not include the number adjacent to the term. The term "at least" prior to a number or series of numbers is understood to include the number adjacent to the term "at least", and all subsequent numbers or integers that could logically be included, as clear from context. If used herein, the terms such as "first" and "second" are merely used for distinguishing technical features, and are not intended to indicate or imply relative importance, or implicitly point out the number of the indicated technical features, or implicitly point out the order of the indicated technical features.

The present disclosure provides a data transmission method and apparatus, a storage medium, and a program product. The method may include: determining a deployment mode between a first NR base station and a second NR base station according to second identification information; then generating target identification information according to the deployment mode; generating control signaling according to the target identification information; sending the control signaling carrying the target indication information to the second NR base station, such that a second OP module of the second NR base station creates a second media processing module according to the target identification information in the control signaling; and finally controls a first media processing module to transmit data to the second media processing module according to the deployment mode. That is to say, in the schemes of the embodiments of the present disclosure, the first OP module of the first NR base station creates the first media processing module and the second OP module of the second NR base station creates the second media processing module, such that in different deployment modes, the first OP module and the second OP module can interact with each other, and the first media processing module and the second media processing module can also interact with each other. In this way, the data transmission can be realized while ignoring the implementation differences and transmission differences between different deployment scenarios of NR-DC, thereby reducing the complexity of implementation by equipment manufacturers and the complexity of version upgrade by operators.

The embodiments of the present disclosure will be further described in detail below in conjunction with the accompanying drawings.

FIG. 1 is a schematic diagram of an NR-DC architecture configured for executing a data transmission method according to an embodiment of the present disclosure. In the embodiment of FIG. 1, a user equipment (UE) (not shown) is connected to two NR stations, one of which serves as a first NR base station 200 and the other serves as a second NR base station 300. The first NR base station 200 is connected to a 5th Generation Core Network (5GC) 100 through an NG-C interface (which is a control-plane interface between a Next Generation Radio Access Network (NG-RAN) and the 5GC 100) and an NG-U interface (which is a user-plane interface between the NG-RAN and the 5GC 100). The second NR base station 300 is connected to the 5GC 100 through an NG-U interface.

Figure 2:
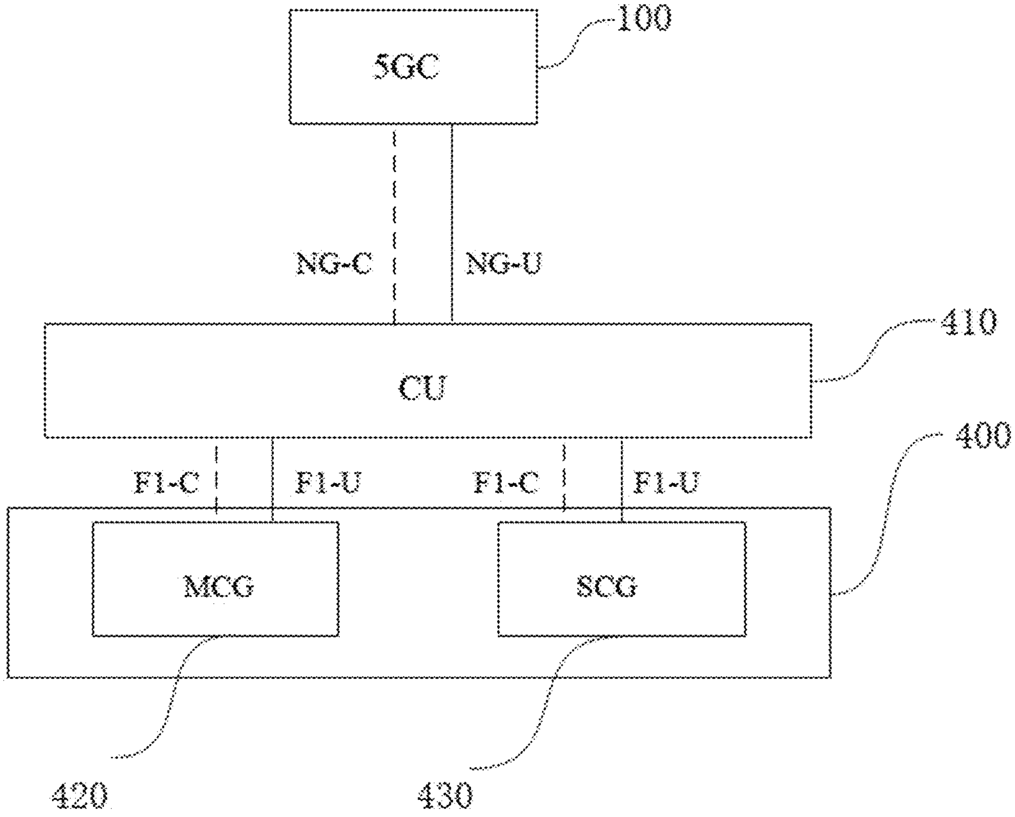
FIG. 2 is a schematic diagram of an NR-DC architecture configured for executing a data transmission method according to another embodiment of the present disclosure.

It should be noted that there is another NR-DC protocol architecture in addition to the NR-DC architecture shown in FIG. 1. As shown in FIG. 2, in an embodiment of FIG. 2, a UE (not shown) is connected to only one NR station, which serves as a third NR base station 400. The third NR base station 400 includes two Distributed Units (DUs), one of which serves as a Master Cell Group (MCG) 420 and the other serves as a Secondary Cell Group (SCG) 430. The MCG 420 is connected to a Centralized Unit (CU) 410 through an F1-C (control plane) interface and an F1-U (user plane) interface. The SCG 430 is connected to the CU 410 through an F1-C interface and an F1-U interface. The CU 410 is connected to a 5GC 100 through an NG-C interface and an NG-U interface.

It should be noted that one NR station may include one CU and a plurality of DUs, one CU may be divided into a control-plane part (CU-CP) and a user-plane part (CU-UP), and one CU may include one CU-CP and a plurality of CU-UPs. The CU-CP is connected to a DU through an F1-C interface, and the CU-UP is connected to a DU through an F1-U interface.

It should be noted that the F1-C (control plane) interface and the F1-U (user plane) interface are F1 interfaces, the F1 interfaces support signaling exchange and data transmission between the CU and the DU, and the F1 interfaces can separate a radio network layer from a transport network layer, and exchange user terminal-related information or non-user terminal related information, etc.

It should also be noted that a plurality of DUs may be centrally controlled by one CU. In theory, there is no limit to the maximum number of DUs that one CU can be connected to, which is only limited by a specific implementation in practice. Although the 3rd Generation Partnership Project (3GPP) standards stipulate that one DU is connected to only one CU, the possibility of connecting a plurality of CUs to one DU to enhance flexibility in practice is not excluded.

It should be noted that the CU and the DU may be divided according to protocol layers of a wireless network. For example, functions of the Packet Data Convergence Protocol (PDCP) and higher protocol layers (e.g., Radio Resource Control (RRC)) are set in the CU. Functions of protocol layers below the PDCP, such as Radio Link Control (RLC), Media Access Control (MAC), Physical layer (PHY), and the like, are set in the DU.

It should be noted that NR-DC may include a dual-connectivity configuration including a low-frequency NR base station and a low-frequency NR base station in terms of frequency bands, i.e., one NR station is a low-frequency NR base station and the other NR station is also a low-frequency NR base station. Alternatively, NR-DC may include a dual-connectivity configuration including a low-frequency NR base station and a high-frequency NR base station, i.e., one NR station is a low-frequency NR base station and the other NR station is a high-frequency NR base station. There are three main deployment scenarios for the integration of the two NR-DC architectures. A dual-connectivity configuration including a low-frequency NR base station and a high-frequency NR base station is used as an example, as shown in FIG. 3 to FIG. 5.

Figure 3:
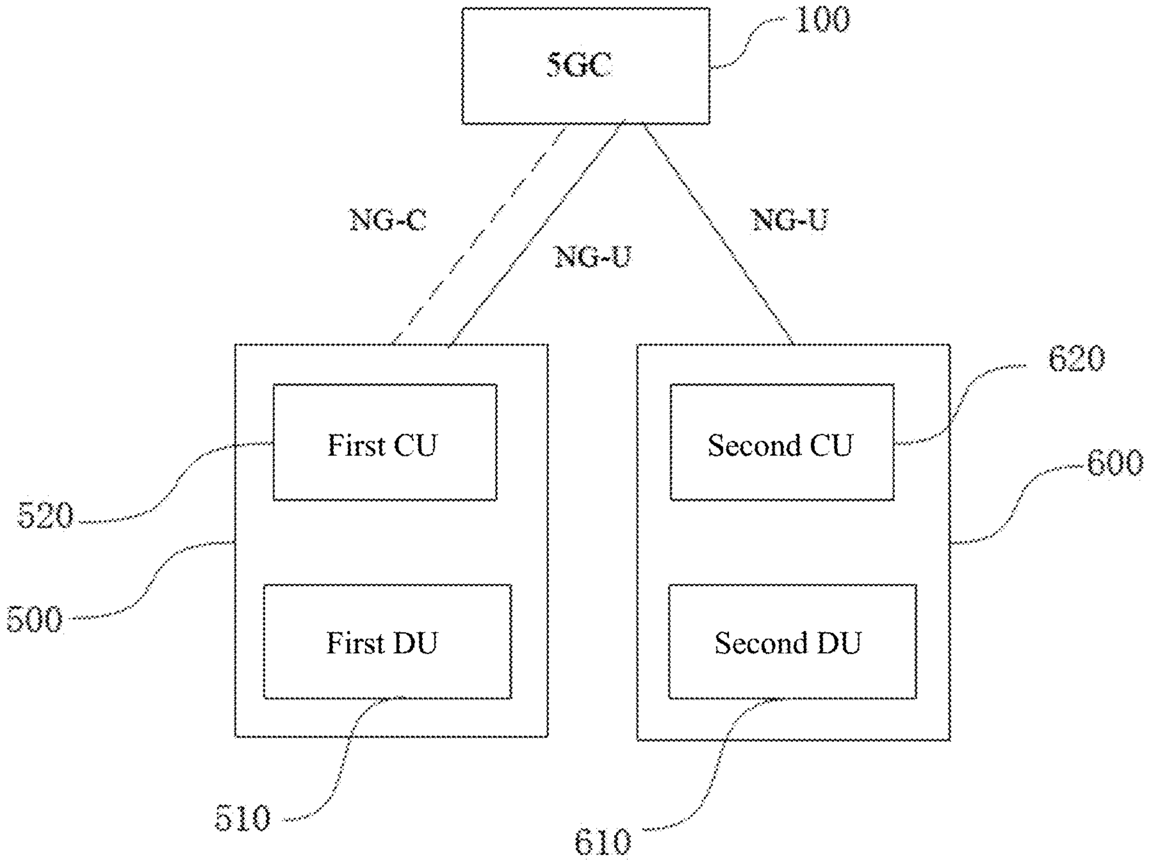
FIG. 3 is a schematic structural diagram of a dual-connectivity configuration including a low-frequency NR base station and a high-frequency NR base station in an inter-station non-co-frame deployment mode according to an example of the present disclosure.

In an example of FIG. 3, a low-frequency NR base station 500 and a high-frequency NR base station 600 are deployed in an inter-station non-co-frame manner, i.e., the low-frequency NR base station 500 and the high-frequency NR base station 600 are two stations in hardware and two stations in logic. A first CU 520 of the low-frequency NR base station 500 is independent of a second CU 620 of the high-frequency NR base station 600. A first DU 510 of the low-frequency NR base station 500 is independent of a second DU 610 of the high-frequency NR base station 600. A Public Land Mobile Network (PLMN) and a Generation NodeB Identity (gNBID) of the low-frequency NR base station 500 are independent of a PLMN and a gNBID of the high-frequency NR base station 600. In addition, an Internet Protocol (IP) address, an NG interface, and an XN interface of the low-frequency NR base station 500 are independent of those of the high-frequency NR base station 600. The NG interface includes an NG-C interface and an NG-U interface. The XN interface is a network interface between NG-RAN nodes. The low-frequency NR base station 500 is connected to the 5GC 100 through an NG-C interface and an NG-U interface. The high-frequency NR base station 600 is connected to the 5GC 100 through an NG-U interface. It should be noted that the low-frequency NR base station 500 and the high-frequency NR base station 600 need to transmit control signaling and communicate media data through XN interfaces in an NR-DC scenario.

Figure 4:
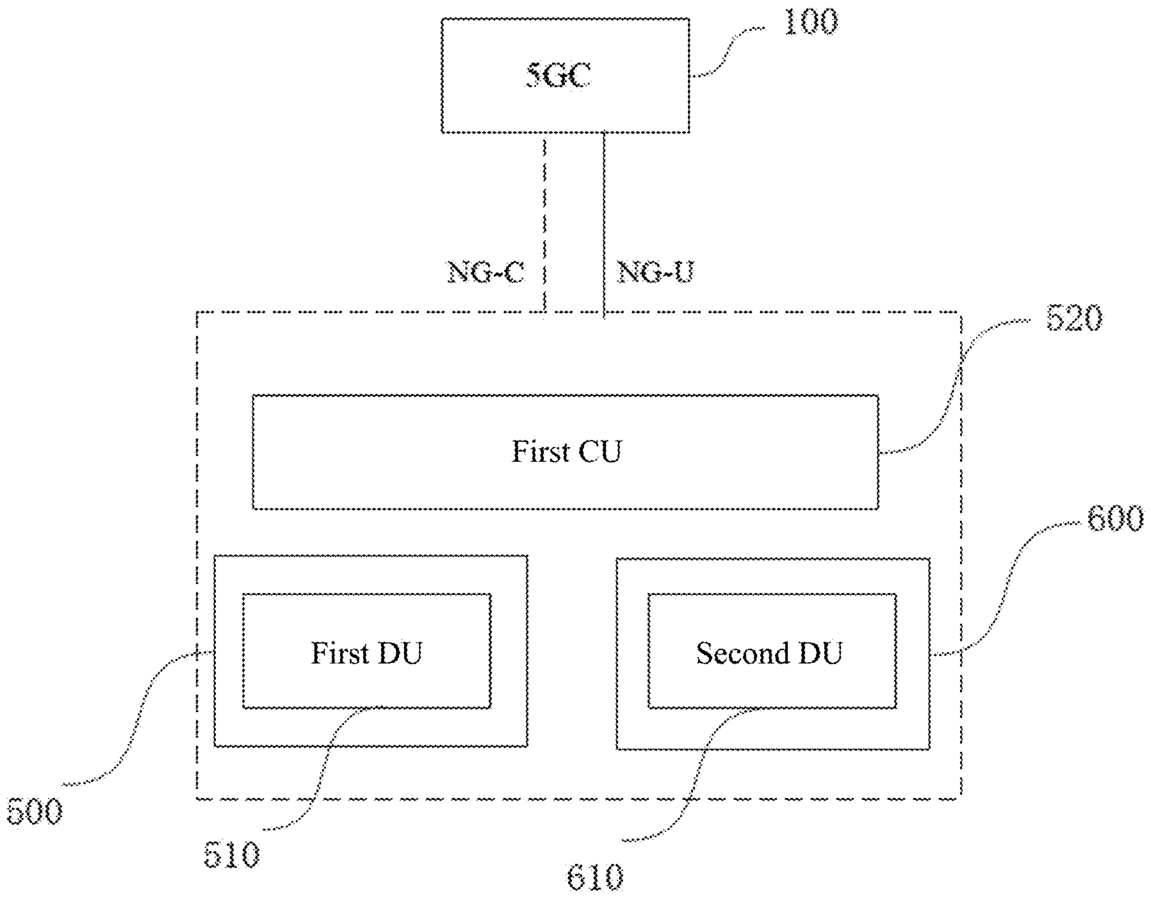
FIG. 4 is a schematic structural diagram of a dual-connectivity configuration including a low-frequency NR base station and a high-frequency NR base station in a co-frame co-logical-station deployment mode according to an example of the present disclosure.

In an example of FIG. 4, a low-frequency NR base station 500 and a high-frequency NR base station 600 are deployed in a co-frame co-logical-station mode, i.e., the low-frequency NR base station 500 and the high-frequency NR base station 600 are one station in hardware and one station in logic. The low-frequency NR base station 500 and the high-frequency NR base station 600 share a first CU 520. A first DU 510 of the low-frequency NR base station 500 is independent of a second DU 610 of the high-frequency NR base station 600. The low-frequency NR base station 500 and the high-frequency NR base station 600 share a same PLMN, gNBID, IP address, and NG interface. The NG interface includes an NG-C interface and an NG-U interface. The low-frequency NR base station 500 and the high-frequency NR base station 600 are each connected to a 5GC 100 through an NG-C interface and an NG-U interface. It should be noted that the first CU 520 has common protocol layers: RRC, General Packet Radio Service Tunneling Protocol-User plane (GTP-U), and Service Data Adaptation Protocol (SDAP). The low-frequency NR base station 500 and the high-frequency NR base station 600 transmit control signaling and communicate media data through an intra-frame custom logical interface in an NR-DC scenario.

Figure 5:
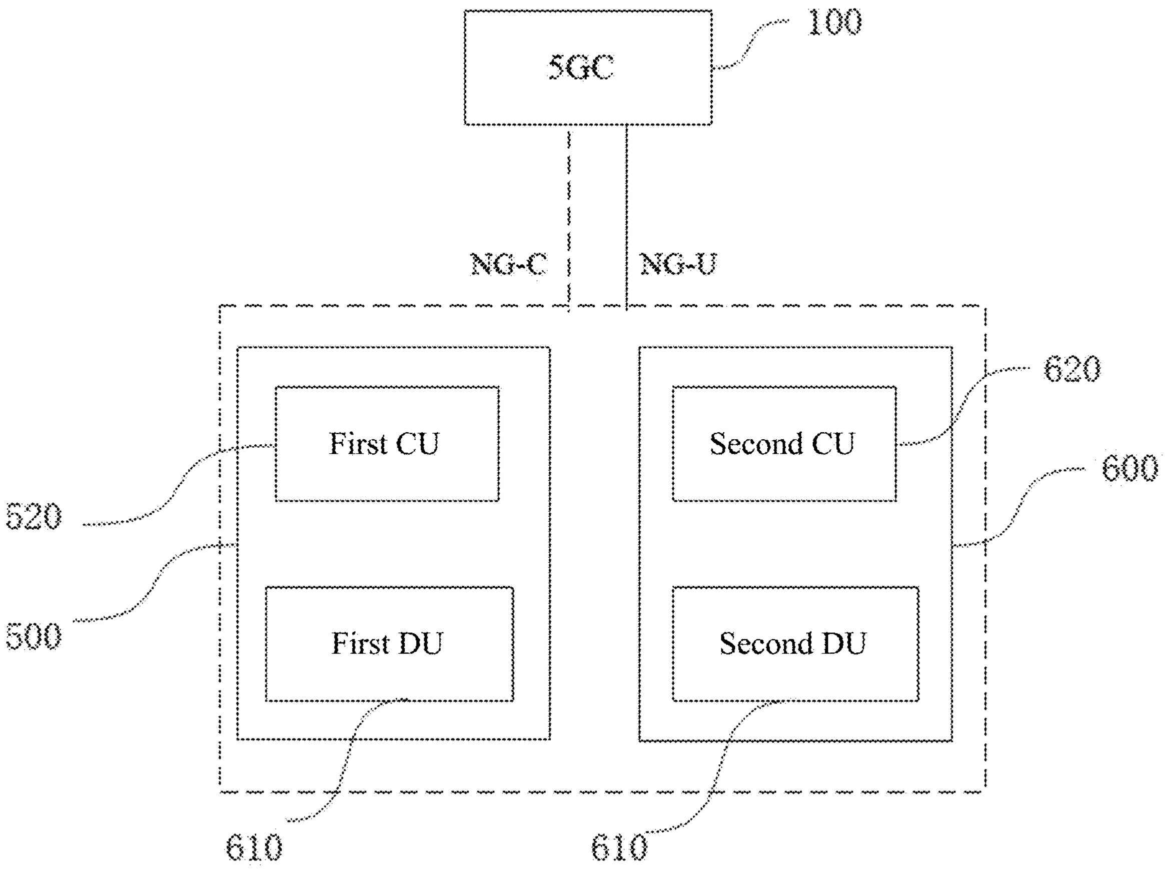
FIG. 5 is a schematic structural diagram of a dual-connectivity configuration including a low-frequency NR base station and a high-frequency NR base station in a co-frame non-co-logical-station deployment mode according to an example of the present disclosure.

In an example of FIG. 5, a low-frequency NR base station 500 and a high-frequency NR base station 600 are deployed in a co-frame non-co-logical-station mode, i.e., the low-frequency NR base station 500 and the high-frequency NR base station 600 are one station in hardware and two stations in logic. A first CU 520 of the low-frequency NR base station 500 is independent of a second CU 620 of the high-frequency NR base station 600. A first DU 510 of the low-frequency NR base station 500 is independent of a second DU 610 of the high-frequency NR base station 600. A PLMN, a gNBID, an IP address, and an NG interface of the low-frequency NR base station 500 are independent of those of the high-frequency NR base station 600. The NG interface includes an NG-C interface and an NG-U interface. The low-frequency NR base station 500 and the high-frequency NR base station 600 are each connected to a 5GC 100 through an NG-C interface and an NG-U interface. The low-frequency NR base station 500 and the high-frequency NR base station 600 transmit control signaling and communicate media data through logical XN interfaces in an NR-DC scenario.

It should be noted that a frequency range corresponding to the low-frequency NR base station 500 may be 450 MHZ to 6000 MHZ, and a frequency range corresponding to the high-frequency NR base station 600 may be 24250 MHZ to 52600 MHZ, which is not particularly limited herein.

It should also be noted that the principle of the dual-connectivity configuration including the low-frequency NR base station 500 and the low-frequency NR base station 500 is consistent with the principle of the dual-connectivity configuration including the low-frequency NR base station 500 and the high-frequency NR base station 600.

The NR-DC architecture and application scenarios described in the embodiments of the present disclosure are for the purpose of illustrating the technical schemes of the embodiments of the present disclosure more clearly, and do not constitute a limitation on the technical schemes provided in the embodiments of the present disclosure. Those having ordinary skills in the art may know that with the evolution of the NR-DC architecture and the emergence of new application scenarios, the technical schemes provided in the embodiments of the present disclosure are also applicable to similar technical problems.

Those having ordinary skills in the art may understand that the NR-DC architectures shown in FIG. 1 and FIG. 2 and the deployment scenarios of NR-DC in FIG. 3 to FIG. 5 do not constitute a limitation to the embodiments of the present disclosure, and more or fewer components than those shown in the figure may be included, or some components may be combined, or a different component arrangement may be used.

Based on the above NR-DC architectures, various embodiments of the data transmission method are proposed below.

Figure 6:
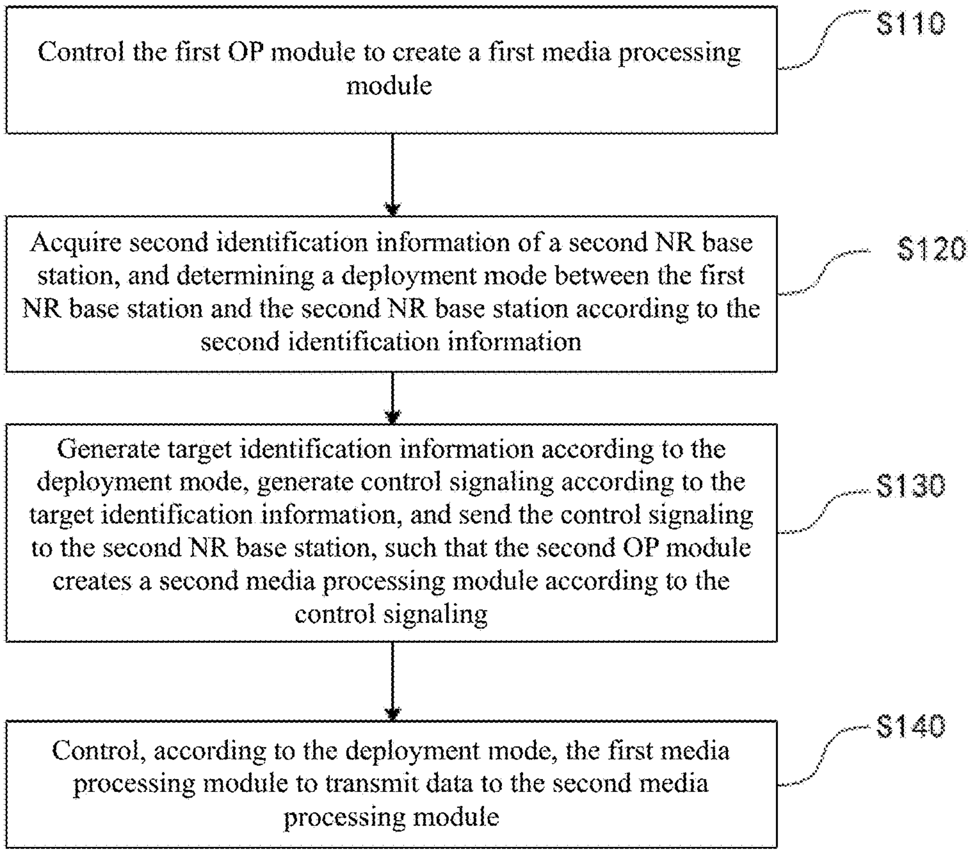
FIG. 6 is a flowchart of a data transmission method applied to a first NR station according to an embodiment of the present disclosure.

FIG. 6 is a flowchart of a data transmission method according to an embodiment of the present disclosure. The data transmission method may be applied to a first NR base station, e.g., the first NR base station in the NR-DC architecture shown in FIG. 1. A first OP module is configured in the first NR base station. The data transmission method includes, but not limited to, the following steps S110, S120, S130, and S140.

At S110, the first OP module is controlled to create a first media processing module.

It should be noted that after receiving a measurement report from a UE, the first NR base station controls the first OP module to create the first media processing module, which is not particularly limited in this embodiment.

It should be noted that the first NR base station may be a low-frequency NR base station or a high-frequency NR base station, a frequency range corresponding to the low-frequency NR base station 500 may be 450 MHZ to 6000 MHZ, and a frequency range corresponding to the high-frequency NR base station 600 may be 24250 MHZ to 52600 MHZ, which is not particularly limited herein.

At S120, second identification information of a second NR base station is acquired, and a deployment mode between the first NR base station and the second NR base station is determined according to the second identification information.

In this step, the first NR base station may acquire the second identification information of the second NR base station in various manners. For example, the first NR base station may acquire the second identification information of the second NR base station according to operations, administration and maintenance (OAM) of the first NR base station, and may also acquire the second identification information in other manners, which is not particularly limited herein.

It should be noted that a second OP module is configured in the second NR base station. The second NR base station may be a low-frequency NR base station or a high-frequency NR base station, a frequency range corresponding to the low-frequency NR base station 500 may be 450 MHZ to 6000 MHZ, and a frequency range corresponding to the high-frequency NR base station 600 may be 24250 MHZ to 52600 MHZ, which is not particularly limited herein.

It should also be noted that the second identification information may include a gNBID and a PLMN, which is not particularly limited in this embodiment.

At S130, target identification information is generated according to the deployment mode, control signaling is generated according to the target identification information, and the control signaling is sent to the second NR base station, such that the second OP module creates a second media processing module according to the control signaling.

In this step, because the deployment mode between the first NR base station and the second NR base station is determined in S120, target identification information may be generated according to the deployment mode, then control signaling may be generated according to the target identification information, and the first OP module sends the control signaling to the second OP module of the second NR base station, such that the second OP module of the second NR base station creates a second media processing module according to the control signaling. In this way, in subsequent steps, the first media processing module may be controlled to transmit data to the second media processing module according to the deployment mode.

At S140, the first media processing module is controlled according to the deployment mode to transmit data to the second media processing module.

In this step, because the deployment mode between the first NR base station and the second NR base station is determined in S120 and the second media processing module is created in S130, the first media processing module can be controlled according to the deployment mode to transmit data to the second media processing module.

It should be noted that the data transmission may be data forwarding or other transmission modes, which is not particularly limited herein.

In this embodiment, by the data transmission method including the above steps S110 to S140, the first NR base station controls the first OP module to create a first media processing module, then acquires second identification information of the second NR base station, determines a deployment mode between the first NR base station and the second NR base station according to the second identification information, generates target identification information according to the deployment mode, and then generates control signaling according to the target identification information. Then, the first OP module sends the control signaling to the second OP module of the second NR base station, such that the second OP module of the second NR base station creates a second media processing module according to the control signaling. Finally, the first media processing module may be controlled to transmit data to the second media processing module according to the deployment mode. That is to say, in the schemes of the embodiments of the present disclosure, the first OP module of the first NR base station creates the first media processing module and the second OP module of the second NR base station creates the second media processing module, such that in different deployment modes, the first OP module and the second OP module can interact with each other, and the first media processing module and the second media processing module can also interact with each other. In this way, the data transmission can be realized while ignoring the implementation differences and transmission differences between different deployment scenarios of NR-DC, thereby reducing the complexity of implementation by equipment manufacturers and the complexity of version upgrade by operators.

It should be noted that the first NR base station may be a low-frequency NR base station or a high-frequency NR base station, which is not particularly limited herein. Similarly, the second NR base station may be a low-frequency NR base station or a high-frequency NR base station, which is not particularly limited herein. In addition, a frequency range corresponding to the low-frequency NR base station 500 may be 450 MHZ to 6000 MHZ, and a frequency range corresponding to the high-frequency NR base station 600 may be 24250 MHZ to 52600 MHZ, which is not particularly limited herein.

Figure 7:
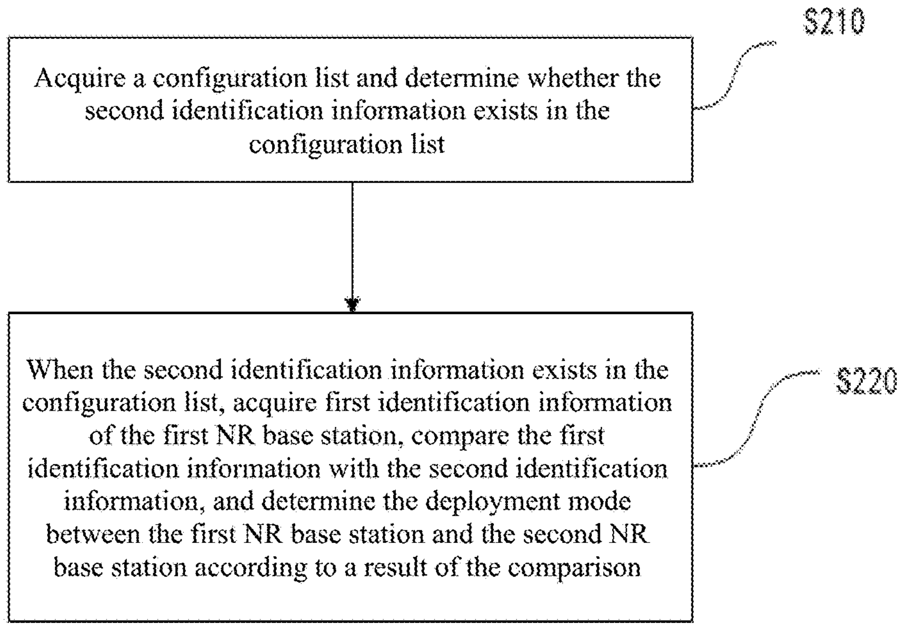
FIG. 7 is a flowchart of an implementation of S120 in FIG. 6.

In an embodiment, as shown in FIG. 7, S120 is further described, and S120 may include, but not limited to, the following steps S210 to S220.

At S210, a configuration list is acquired and it is determined whether the second identification information exists in the configuration list.

In this step, the first NR base station acquires its own configuration list and checks whether the second identification information exists in the configuration list.

At S220, when the second identification information exists in the configuration list, first identification information of the first NR base station is acquired, the first identification information is compared with the second identification information, and the deployment mode between the first NR base station and the second NR base station is determined according to a result of the comparison.

Since it is checked in S210 whether the second identification information exists in the configuration list, in this step, if the second identification information exists in the configuration list, first identification information of the first NR base station is acquired, the first identification information is compared with the second identification information, and the deployment mode between the first NR base station and the second NR base station is determined according to a result of the comparison.

It should be noted that the first identification information may include a gNBID and a PLMN of the first NR base station, or may include other information. Similarly, the second identification information may include a gNBID and a PLMN of the second NR base station, or may include other information, which is not particularly limited herein.

In this embodiment, by the data transmission method including S210 and S220, the first NR base station acquires its own configuration list, and determines whether the second identification information exists in the configuration list. If the second identification information exists in the configuration list, the first identification information of the first NR base station is acquired and compared with the second identification information, and the deployment mode between the first NR base station and the second NR base station is determined according to the result of the comparison.

In an embodiment, the first NR base station acquires its own configuration list, where when the gNBID and the PLMN of the second NR base station exist in the configuration list, it indicates that the first NR base station and the second NR base station are in the same frame, or otherwise, the first NR base station and the second NR base station are in separate frames, which is not particularly limited in this embodiment.

Figure 8:
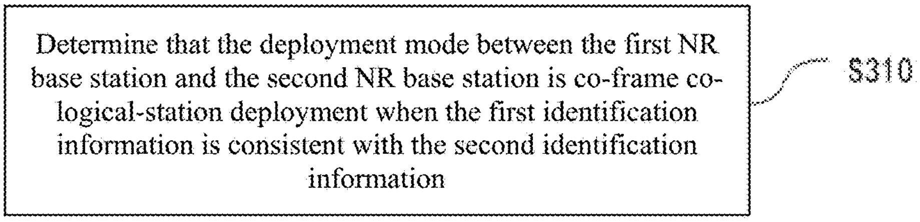
FIG. 8 is a flowchart of an implementation of S220 in FIG. 7.

In an embodiment, as shown in FIG. 8, S220 is further described, and S220 may include, but not limited to, a following step S310.

At S310, it is determined that the deployment mode between the first NR base station and the second NR base station is co-frame co-logical-station deployment when the first identification information is consistent with the second identification information.

In this embodiment, because it has been determined in S220 that the second identification information exists in the configuration list of the first NR base station, the first NR base station acquires its own first identification information, and compares the first identification information with the second identification information. When the first identification information is consistent with the second identification information, it is determined that the deployment mode between the first NR base station and the second NR base station is co-frame co-logical-station deployment.

In an embodiment, it is assumed that the first identification information includes a gNBID and a PLMN of the first NR base station, and the second identification information includes a gNBID and a PLMN of the second NR base station. When the gNBID of the first NR base station is consistent with the gNBID of the second NR base station and the PLMN of the first NR base station is consistent with the PLMN of the second NR base station, it indicates that the first identification information is consistent with the second identification information, and it is determined that the deployment mode between the first NR base station and the second NR base station is co-frame co-logical-station deployment; otherwise, it indicates that the first identification information is not consistent with the second identification information, which is not particularly limited in this embodiment.

Figure 9:
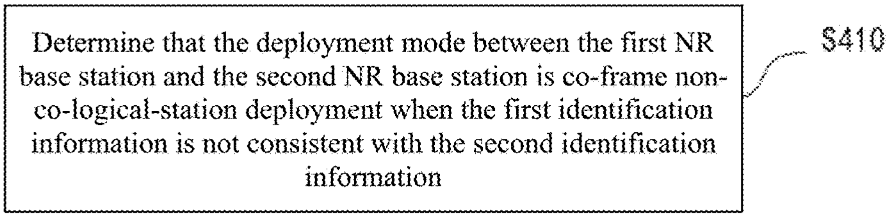
FIG. 9 is a flowchart of another implementation of S220 in FIG. 7.

In another embodiment, as shown in FIG. 9, S220 is further described, and S220 may include, but not limited to, a following step S410.

At S410, it is determined that the deployment mode between the first NR base station and the second NR base station is co-frame non-co-logical-station deployment when the first identification information is not consistent with the second identification information.

In this embodiment, because it has been determined in S220 that the second identification information exists in the configuration list of the first NR base station, the first NR base station acquires its own first identification information, and compares the first identification information with the second identification information. When the first identification information is not consistent with the second identification information, it is determined that the deployment mode between the first NR base station and the second NR base station is co-frame non-co-logical-station deployment.

It should be noted that the embodiment shown in FIG. 9 and the embodiment shown in FIG. 8 are parallel embodiments and correspond to different deployment modes respectively.

In an embodiment, it is assumed that the first identification information includes a gNBID and a PLMN of the first NR base station, and the second identification information includes a gNBID and a PLMN of the second NR base station. When the gNBID of the first NR base station is consistent with the gNBID of the second NR base station and the PLMN of the first NR base station is not consistent with the PLMN of the second NR base station, it indicates that the first identification information is not consistent with the second identification information, and it is determined that the deployment mode between the first NR base station and the second NR base station is co-frame non-co-logical-station deployment. Alternatively, when the gNBID of the first NR base station is not consistent with the gNBID of the second NR base station and the PLMN of the first NR base station is consistent with the PLMN of the second NR base station, it indicates that the first identification information is not consistent with the second identification information, and it is determined that the deployment mode between the first NR base station and the second NR base station is co-frame non-co-logical-station deployment. Alternatively, when the gNBID of the first NR base station is not consistent with the gNBID of the second NR base station and the PLMN of the first NR base station is not consistent with the PLMN of the second NR base station, it indicates that the first identification information is not consistent with the second identification information, and it is determined that the deployment mode between the first NR base station and the second NR base station is co-frame non-co-logical-station deployment.

Figure 10:
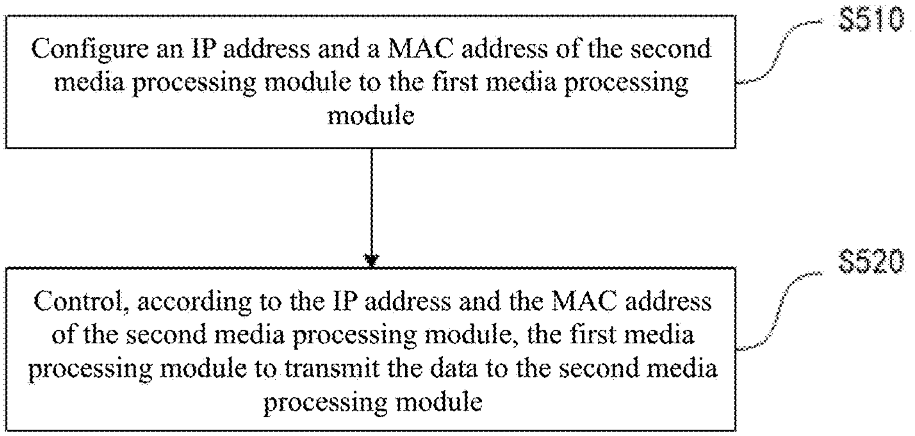
FIG. 10 is a flowchart of a first implementation of S140 in FIG. 6.

In an embodiment, as shown in FIG. 10, S140 is further described, and when it is determined that the deployment mode between the first NR base station and the second NR base station is co-frame co-logical-station deployment, S140 may include, but not limited to, the following steps S510 and S520.

At S510, an IP address and a MAC address of the second media processing module are configured to the first media processing module.

In this step, when it is determined that the deployment mode between the first NR base station and the second NR base station is co-frame co-logical-station deployment, the first OP module configures the IP address and the MAC address of the second media processing module, and sends the IP address and the MAC address of the second media processing module to the first media processing module. In this way, in subsequent steps, the first media processing module can be controlled according to the IP address and the MAC address of the second media processing module to transmit the data to the second media processing module.

At S520, the first media processing module is controlled according to the IP address and the MAC address of the second media processing module to transmit the data to the second media processing module.

It should be noted that the data transmission may be data forwarding or other transmission modes, which is not particularly limited herein.

In this step, because the IP address and the MAC address of the second media processing module are obtained in S510, the first NR base station can control, according to the IP address and the MAC address of the second media processing module, the first media processing module to transmit the data to the second media processing module.

In this embodiment, by the data transmission method including S510 to S520, when it is determined that the deployment mode between the first NR base station and the second NR base station is co-frame co-logical-station deployment, the first OP module configures the IP address and the MAC address of the second media processing module, sends the IP address and the MAC address of the second media processing module to the first media processing module, and controls, according to the IP address and the MAC address of the second media processing module, the first media processing module to transmit the data to the second media processing module.

It should be noted that the MAC address, also known as a Local Area Network (LAN) address, an Ethernet address, or a physical address, is an address for determining a location of a device on the network. For example, a physical address of the second media processing module can be determined from the MAC address of the second media processing module.

Figure 11:
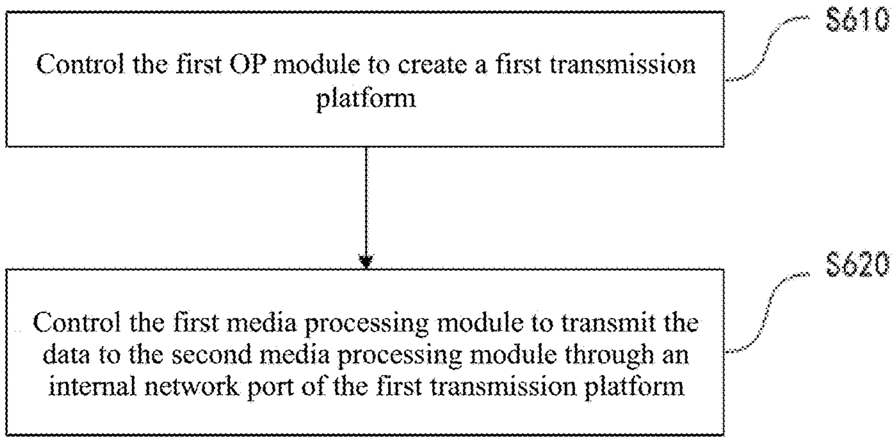
FIG. 11 is a flowchart of a second implementation of S140 in FIG. 6.

In an embodiment, as shown in FIG. 11, S140 is further described, and when it is determined that the deployment mode between the first NR base station and the second NR base station is co-frame non-co-logical-station deployment, S140 may include, but not limited to, the following steps S610 and S620.

At S610, the first OP module is controlled to create a first transmission platform.

In this step, when determining that the deployment mode between the first NR base station and the second NR base station is co-frame non-co-logical-station deployment, the first NR base station may control the first OP module to create a first transmission platform, such that in subsequent steps, the first media processing module transmits the data to the second media processing module through an internal network port of the first transmission platform.

At S620, the first media processing module is controlled to transmit the data to the second media processing module through an internal network port of the first transmission platform.

In this step, because the first transmission platform has been created in S610, the first media processing module is controlled to transmit the data to the second media processing module through an internal network port of the first transmission platform.

It should be noted that the data transmission may be data forwarding or other transmission modes, which is not particularly limited herein.

In this embodiment, by the data transmission method including S610 to S620, when it is determined that the deployment mode between the first NR base station and the second NR base station is co-frame non-co-logical-station deployment, the first NR base station can control the first OP module to create the first transmission platform, and then the first media processing module can transmit data to the second media processing module through the internal network port of the first transmission platform.

Figure 12:
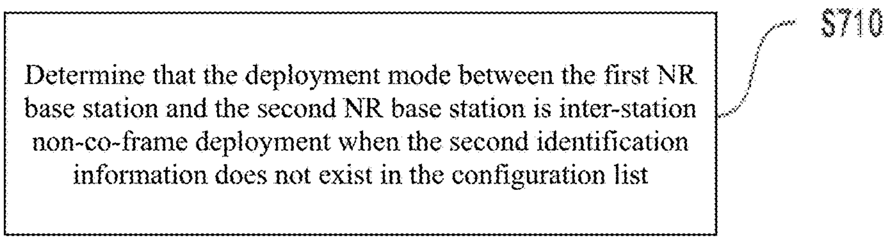
FIG. 12 is a flowchart of another implementation of S120 in FIG. 6.

In an embodiment, as shown in FIG. 12, S120 is further described, and S120 may include, but not limited to, a following step S710.

At S710, it is determined that the deployment mode between the first NR base station and the second NR base station is inter-station non-co-frame deployment when the second identification information does not exist in the configuration list.

In this embodiment, the first NR base station acquires its own configuration list, and checks whether the configuration list contains the second identification information. When the second identification information does not exist in the configuration list, it is determined that the deployment mode between the first NR base station and the second NR base station is inter-station non-co-frame deployment, which is not particularly limited in this embodiment.

It should be noted that the second identification information may include a gNBID and a PLMN of the second NR base station, or may include other information, which is not particularly limited herein.

It should be noted that the embodiment shown in FIG. 12, the embodiment shown in FIG. 9, and the embodiment shown in FIG. 8 are parallel embodiments and correspond to different deployment modes respectively.

Figure 13:
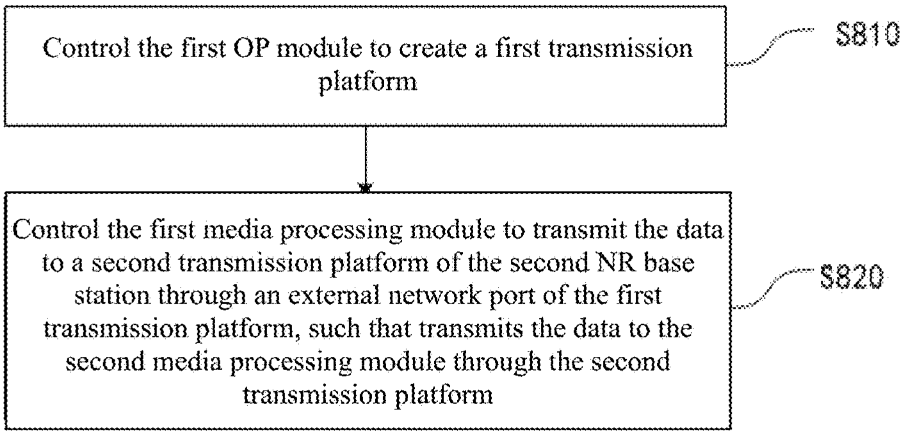
FIG. 13 is a flowchart of a third implementation of S140 in FIG. 6.

In an embodiment, as shown in FIG. 13, S140 is further described, and when it is determined that the deployment mode between the first NR base station and the second NR base station is inter-station non-co-frame deployment, S140 may include, but not limited to, the following steps S810 and S820.

At S810, the first OP module is controlled to create a first transmission platform.

In this step, when it is determined that the deployment mode between the first NR base station and the second NR base station is inter-station non-co-frame deployment, the first NR base station can control the first OP module to create the first transmission platform. In this way, in subsequent steps, the first media processing module transmits data to the second transmission platform of the second NR base station through an external network port of the first transmission platform, such that transmitting the data to the second media processing module through the second transmission platform.

At S820, the first media processing module is controlled to transmit the data to a second transmission platform of the second NR base station through an external network port of the first transmission platform, such that transmitting the data to the second media processing module through the second transmission platform.

In this step, because the first transmission platform has been created in S810, the first media processing module is controlled to transmit the data to the second transmission platform of the second NR base station through the external network port of the first transmission platform, such that transmitting the data to the second media processing module through the second transmission platform.

It should be noted that the data transmission may be data forwarding or other transmission modes, which is not particularly limited herein.

In this embodiment, by the data transmission method including S810 to S820, when it is determined that the deployment mode between the first NR base station and the second NR base station is inter-station non-co-frame deployment, the first NR base station can control the first OP module to create the first transmission platform, and then the first media processing module can transmit data to the second transmission platform of the second NR base station through the external network port of the first transmission platform, such that transmitting the data to the second media processing module through the second transmission platform.

Figure 14:
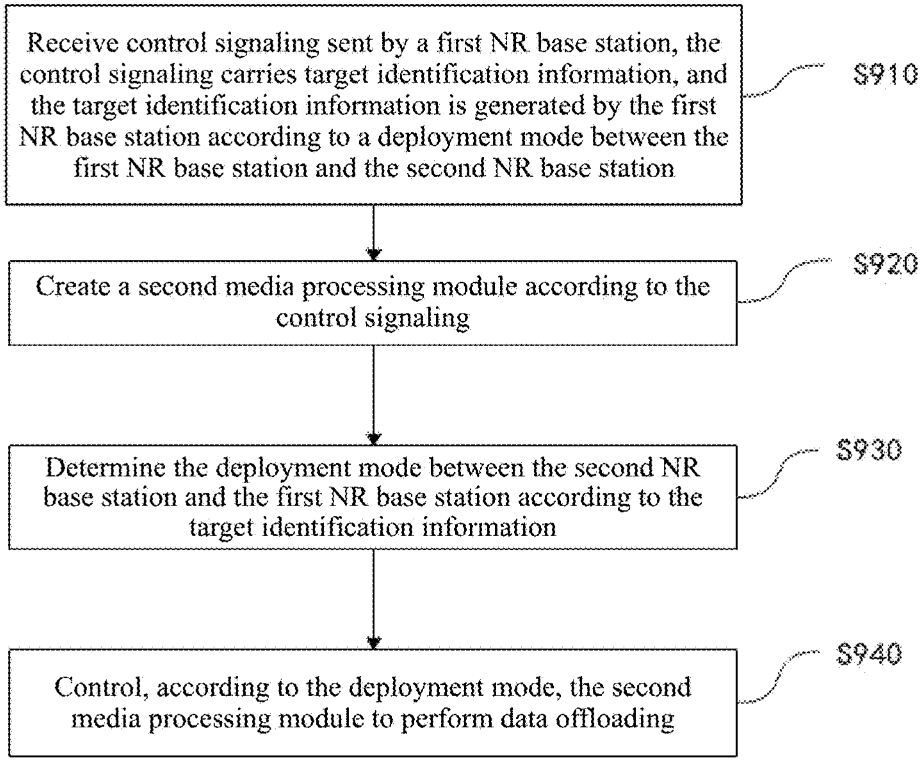
FIG. 14 is a flowchart of a data transmission method applied to a second NR station according to an embodiment of the present disclosure.

FIG. 14 is a flowchart of a data transmission method according to another embodiment of the present disclosure. The data transmission method may be applied to a second NR base station, e.g., the second NR base station in the NR-DC architecture shown in FIG. 1. The data transmission method includes, but not limited to, the following steps S910, S920, S930, and S940.

At S910, control signaling sent by a first NR base station is received, where the control signaling carries target identification information, and the target identification information is generated by the first NR base station according to a deployment mode between the first NR base station and the second NR base station.

It should be noted that the target identification information may be an identifier (ID) of a first OP module of the first NR base station, a virtual Stream Control Transmission Protocol (vSCTP)-related message, an SCTP-related message, or other messages, which is not particularly limited herein.

It should be noted that the second NR base station may receive the control instruction through an XN interface, a logical XN interface, or an internal interface, which is not particularly limited herein.

At S920, a second media processing module is created according to the control signaling.

In this step, since the control signaling sent by the first NR base station is received in S910, the second NR base station creates a second media processing module according to the control signaling after receiving the control signaling, such that the second media processing module can be used for data distributing in subsequent steps.

It should be noted that the second media processing module is created by a second OP module of the second NR base station after receiving the control signaling, which is not particularly limited herein.

At S930, the deployment mode between the second NR base station and the first NR base station is determined according to the target identification information.

At S940, the second media processing module is controlled according to the deployment mode to perform data distributing.

It should be noted that the data distributing is related to a bearer type, and the bearer type is closely related to a service type. Bearer types include a split bearer and a radio bearer.

It should be noted that an object for the second media processing module for data distributing may be the first NR base station or the second NR base station, which is not particularly limited herein. For example, a core network first sends data to the second media processing module, and after receiving the data, the second media processing module sends a part of the data to the first media processing module and keep the other part of the data in the second NR base station for distributing, which is not particularly limited herein.

In this embodiment, by the data transmission method including S910 to S940, the second NR base station can receive the control signaling sent by the first NR base station, where the control signaling carries the target identification information generated by the first NR base station according to the deployment mode between the first NR base station and the second NR base station; determine the deployment mode between the second NR base station and the first NR base station according to the target identification information; create the second media processing module according to the control signaling; and finally control, according to the deployment mode, the second media processing module to perform data distributing.

It should be noted that the first NR base station may be a low-frequency NR base station or a high-frequency NR base station, which is not particularly limited herein. Similarly, the second NR base station may be a low-frequency NR base station or a high-frequency NR base station, which is not particularly limited herein.

Figure 15:
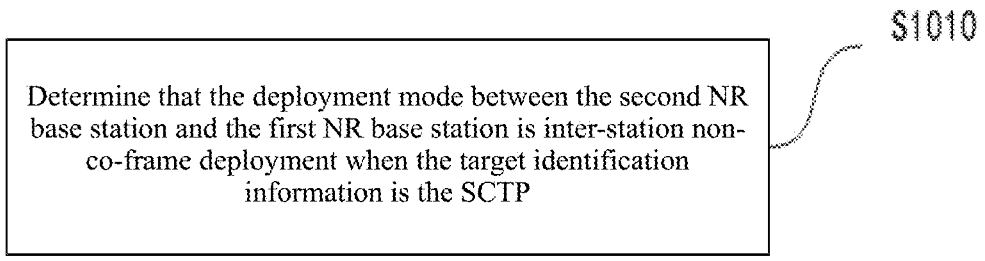
FIG. 15 is a flowchart of a first implementation of S930 in FIG. 14.

In an embodiment, as shown in FIG. 15, S930 is further described, and S930 may include, but not limited to, a following step S1010.

At S1010, it is determined that the deployment mode between the second NR base station and the first NR base station is inter-station non-co-frame deployment when the target identification information is the SCTP.

In an embodiment, when the second NR base station receives the control instruction sent by the first NR base station, the second NR base station creates a second media processing module according to the control instruction. Because the control instruction carries an SCTP, the second NR base station determines according to the SCTP that the deployment mode between the second NR base station and the first NR base station is inter-station non-co-frame deployment, which is not particularly limited in this embodiment.

Figure 16:
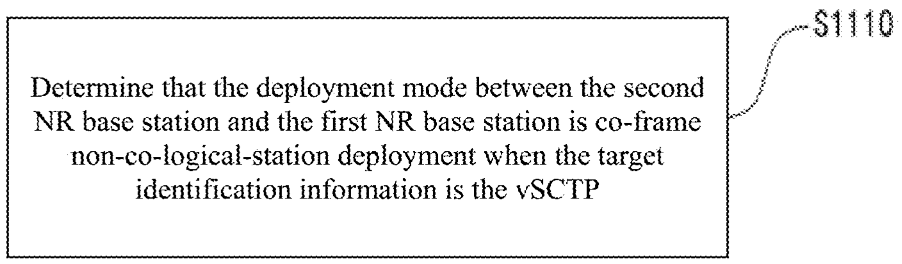
FIG. 16 is a flowchart of a second implementation of S930 in FIG. 14.

In an embodiment, as shown in FIG. 16, S930 is further described, and S930 may further include, but not limited to, a following step S1110.

At S1110, it is determined that the deployment mode between the second NR base station and the first NR base station is co-frame non-co-logical-station deployment when the target identification information is the vSCTP.

In an embodiment, when the second NR base station receives the control instruction sent by the first NR base station, the second NR base station creates a second media processing module according to the control instruction. Because the control instruction carries a vSCTP, the second NR base station determines according to the vSCTP that the deployment mode between the second NR base station and the first NR base station is co-frame non-co-logical-station deployment, which is not particularly limited in this embodiment.

Figure 17:
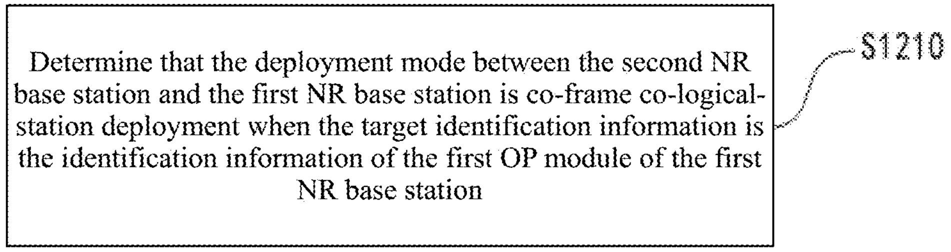
FIG. 17 is a flowchart of a third implementation of S930 in FIG. 14.

In an embodiment, as shown in FIG. 17, S930 is further described, and S930 may further include, but not limited to, a following step S1210.

At S1210, it is determined that the deployment mode between the second NR base station and the first NR base station is co-frame co-logical-station deployment when the target identification information is the identification information of the first OP module of the first NR base station.

It should be noted that the identification information of the first OP module of the first NR base station may be an ID of the first OP module or other information, which is not particularly limited herein.

In an embodiment, when the second NR base station receives the control instruction sent by the first NR base station, the second NR base station creates a second media processing module according to the control instruction. Because the control instruction carries an ID of the first OP module, the second NR base station determines according to the ID of the first OP module that the deployment mode between the second NR base station and the first NR base station is co-frame co-logical-station deployment, which is not particularly limited in this embodiment.

It should be noted that the embodiment shown in FIG. 15, the embodiment shown in FIG. 16, and the embodiment shown in FIG. 17 are parallel embodiments and correspond to different deployment modes respectively.

Figure 18:
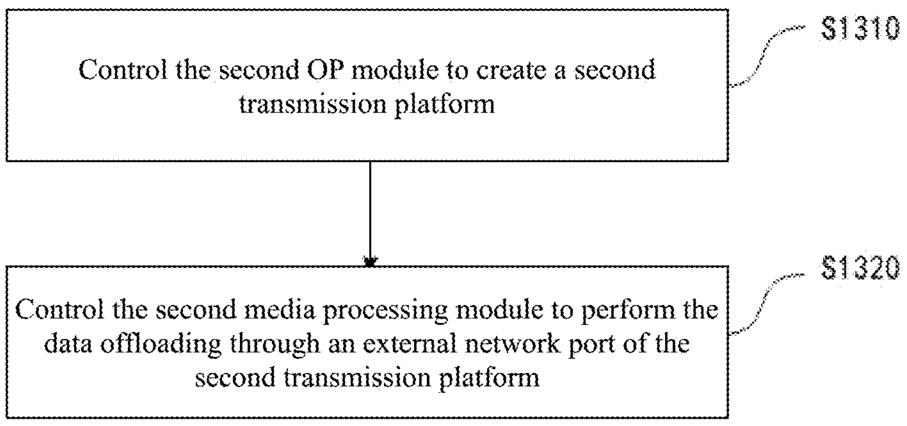
FIG. 18 is a flowchart of a first implementation of S940 in FIG. 14.

In an embodiment, as shown in FIG. 18, S940 is further described, and when the deployment mode is inter-station non-co-frame deployment, S940 may further include, but not limited to, the following steps S1310 and S1320.

At S1310, the second OP module is controlled to create a second transmission platform.

At S1320, the second media processing module is controlled to perform the data distributing through an external network port of the second transmission platform.

In this embodiment, when the deployment mode between the first NR base station and the second NR base station is inter-station non-co-frame deployment, the second NR base station controls the second OP module to create a second transmission platform, and the second media processing module performs data distributing through an external network port of the second transmission platform.

Figure 19:
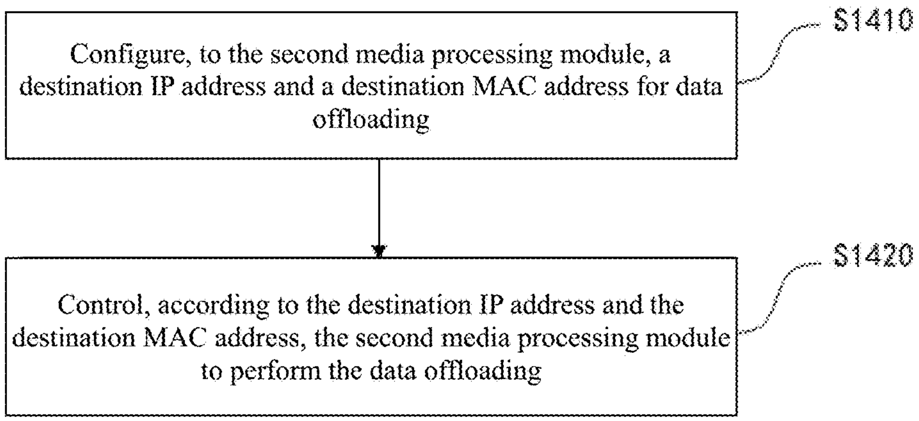
FIG. 19 is a flowchart of a second implementation of S940 in FIG. 14.

In an embodiment, as shown in FIG. 19, S940 is further described, and when the deployment mode is co-frame co-logical-station deployment, S940 may further include, but not limited to, the following steps S1410 and S1420.

At S1410, a destination IP address and a destination MAC address for data distributing are configured to the second media processing module.

It should be noted that the destination IP address and the destination MAC address may belong to the first media processing module of the first NR base station or a device in the second NR base station, which is not particularly limited in this embodiment.

At S1420, the second media processing module is controlled according to the destination IP address and the destination MAC address to perform the data distributing.

In this embodiment, when the deployment mode between the first NR base station and the second NR base station is co-frame co-logical-station deployment, the second NR base station controls the second OP module to configure the destination IP address and the destination MAC address for data distributing, and controls, according to the destination IP address and the destination MAC address, the second media processing module to perform data distributing.

In an embodiment, when the deployment mode between the first NR base station and the second NR base station is co-frame co-logical-station deployment, the second OP module configures a destination IP address and a destination MAC address for data distributing, adds the destination IP address and the destination MAC address into a data header for which data distributing is to be performed, and controls, according to the destination IP address and the destination MAC address, the second media processing module to perform data distributing, which is not particularly limited in this embodiment.

Figure 20:
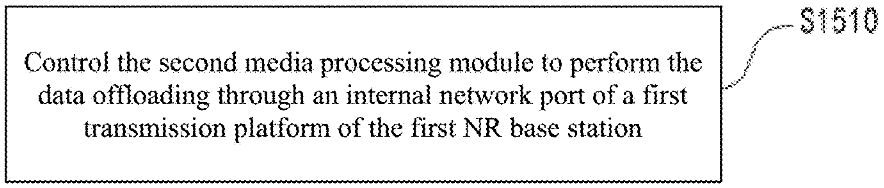
FIG. 20 is a flowchart of a third implementation of S940 in FIG. 14.

In an embodiment, as shown in FIG. 20, S940 is further described, and when the deployment mode is co-frame non-co-logical-station deployment, S940 may further include, but not limited to, a following step S1510.

At S1510, the second media processing module is controlled to perform the data distributing through an internal network port of a first transmission platform of the first NR base station.

In this embodiment, when the deployment mode between the first NR base station and the second NR base station is co-frame non-co-logical-station deployment, the second NR base station controls the second media processing module to perform the data distributing through an internal network port of a first transmission platform of the first NR base station.

It should be noted that the embodiment shown in FIG. 18, the embodiment shown in FIG. 19, and the embodiment shown in FIG. 20 are parallel embodiments and correspond to different deployment modes respectively.

The data transmission methods provided in the above embodiments will be described in detail below using specific examples:

Example One

Figure 21:
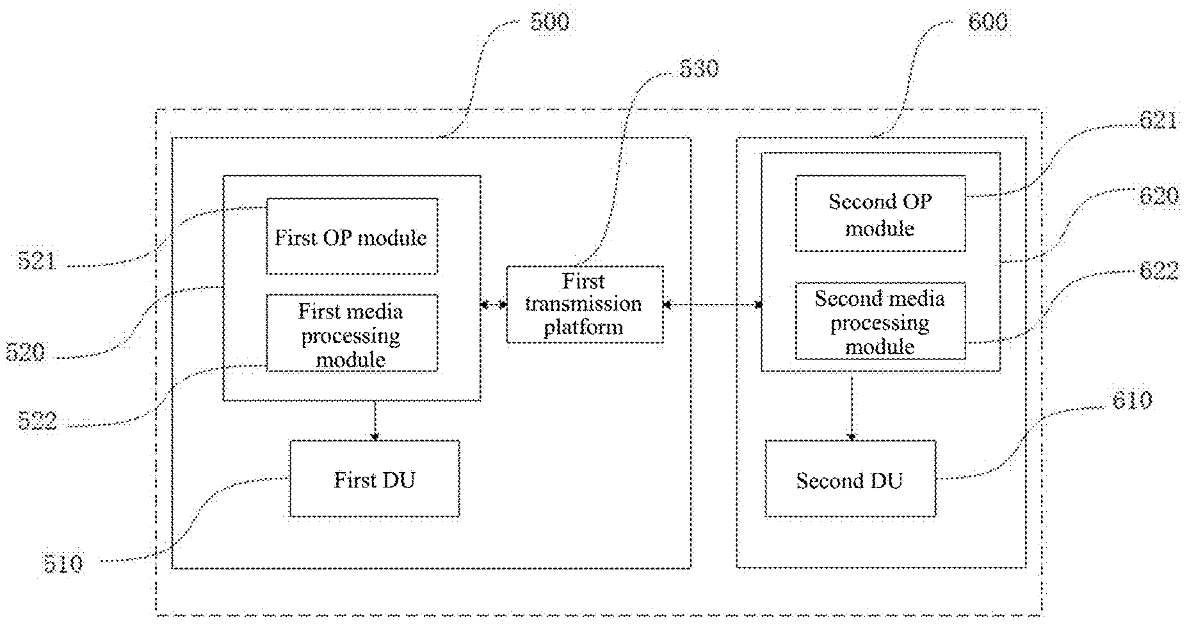
FIG. 21 is a schematic diagram of application of a dual-connectivity configuration including a low-frequency NR base station and a high-frequency NR base station configured for executing a data transmission method, to a co-frame deployment scenario according to an example of the present disclosure.

Referring to FIG. 21, it is assumed that the first NR base station is a low-frequency NR base station 500, and the second NR base station is a high-frequency NR base station 600. The low-frequency NR base station 500 includes a first DU 510 and a first CU 520. The high-frequency NR base station 600 includes a second DU 610 and a second CU 620. The first DU 510 is in communication connection with the first CU 520. The second DU 610 is in communication connection with the second CU 620. After receiving a measurement report from a UE, the low-frequency NR base station 500 performs dual-connectivity addition with the high-frequency NR base station 600. First, the low-frequency NR base station 500 creates a first OP module 521. The first OP module 521 is located within the first CU 520. The first OP module 521 acquires a configuration list of the low-frequency NR base station 500 according to low-frequency OAM; determines whether a gNBID and a PLMN of the high-frequency NR base station 600 exist in the configuration list; if yes, determines through comparison whether a gNBID of the low-frequency NR base station 500 is consistent with the gNBID of the high-frequency NR base station 600 and whether a PLMN of the low-frequency NR base station 500 is consistent with the PLMN of the high-frequency NR base station 600; and if the gNBID of the low-frequency NR base station 500 is consistent with the gNBID of the high-frequency NR base station 600 and the PLMN of the low-frequency NR base station 500 is consistent with the PLMN of the high-frequency NR base station 600, determines that the low-frequency NR base station 500 and the high-frequency NR base station 600 are deployed in a co-frame co-logical-station mode. Next, the first OP module 521 configures a first transmission platform 530, and creates a first media processing module. The first media processing module is located within the first CU 520. The first OP module 521 sends an SN Addition Request message to a second OP module 621 of the high-frequency NR base station 600 through the first transmission platform 530. The SN Addition Request message is attached with control signaling carrying ID information of the first OP module 521. After receiving the request, the second OP module 621 creates a second media processing module 622. The second media processing module 622 is located within the second CU 620 and returns an SN Addition Request Response message to the first OP module 521. The second OP module 621 acquires the ID information of the first OP module 521 from the control signaling. The second OP module 621 may directly send a message to the first OP module 521 according to the ID information of the first OP module 521, where the message carries ID information of the second OP module 621. After receiving the message carrying the ID information of the second OP module 621, the first OP module 521 can acquire the ID information of the second OP module 621. Then, the first OP module 521 and the second OP module 621 may communicate with each other using the ID information of the other party. After the first media processing module 522 receives a data forwarding notification, the first OP module 521 configures an IP address and a MAC address of the second media processing module 622 to the first media processing module 522. Then, the first media processing module 522 directly adds the IP address and the MAC address into a data header of data to be forwarded, which is sent to the second media processing module 622 through the first transmission platform 530. In this example, from the user's point of view, the use of the dual-master dual-instance scheme and the use of different transmission modes in different deployment scenarios shorten the NR-DC process and the data transmission delay, thereby improving the quality of experience.

It should be noted that the first OP module 521 and the second OP module 621 each send a message through an XN interface, and the message is encoded using Abstract Syntax Notation One (ASN.1).

Example Two

This example is based on the same schematic structural diagram as Example One. Referring to FIG. 21, it is assumed that the first NR base station is a low-frequency NR base station 500, and the second NR base station is a high-frequency NR base station 600. The low-frequency NR base station 500 includes a first DU 510 and a first CU 520. The high-frequency NR base station 600 includes a second DU 610 and a second CU 620. The first DU 510 is in communication connection with the first CU 520. The second DU 610 is in communication connection with the second CU 620. After receiving a measurement report from a UE, the low-frequency NR base station 500 performs dual-connectivity addition with the high-frequency NR base station 600. First, the low-frequency NR base station 500 creates a first OP module 521. The first OP module 521 is located within the first CU 520. The first OP module 521 acquires a configuration list of the low-frequency NR base station 500 according to low-frequency OAM; determines whether a gNBID and a PLMN of the high-frequency NR base station 600 exist in the configuration list; if yes, determines through comparison whether a gNBID of the low-frequency NR base station 500 is consistent with the gNBID of the high-frequency NR base station 600 and whether a PLMN of the low-frequency NR base station 500 is consistent with the PLMN of the high-frequency NR base station 600; and if the gNBID of the low-frequency NR base station 500 is not consistent with the gNBID of the high-frequency NR base station 600 and/or the PLMN of the low-frequency NR base station 500 is not consistent with the PLMN of the high-frequency NR base station 600, determines that the low-frequency NR base station 500 and the high-frequency NR base station 600 are deployed in a co-frame non-co-logical-station mode. Next, the first OP module 521 configures a first transmission platform 530, and creates a first media processing module 522. The first media processing module 522 is located within the first CU 520, and sends an SN Addition Request message to a second OP module 621 of the high-frequency NR base station 600 through an internal network port of the first transmission platform 530. The SN Addition Request message is attached with control signaling carrying a vSCTP, sent to a logical XN interface, and then sent to the second OP module 621 of the high-frequency NR base station 600 through the logical XN interface. After receiving the control signaling, the second OP module 621 creates a second media processing module 622. The second media processing module 622 is located within the second CU 620 and returns an SN Addition Request Response message to the first OP module 521. The second OP module 621 acquires the vSCTP from the control signaling. The second OP module 621 may determine according to the vSCTP that the high-frequency NR base station 600 and the low-frequency NR base station 500 are deployed in a co-frame non-co-logical-station mode. Then, the first OP module 521 and the second OP module 621 may communicate with each other over the vSCTP. After the first media processing module 522 receives a data forwarding notification, the first OP module 521 configures an IP address of the second media processing module 622 to the first media processing module 522. Then, the first media processing module 522 directly adds the IP address into a data header of data to be forwarded, which is sent to the second media processing module 622 through the internal network port of the first transmission platform 530. From the operator's point of view, this example saves physical resources for the operator, to be specific, saves half of SCTP links between transmission resources and IP resources and a 5GC, thereby greatly reducing the maintenance costs of the operator and improving the performance of base stations. From the user's point of view, the use of the dual-master dual-instance scheme and the use of different transmission modes in different deployment scenarios shorten the NR-DC process and the data transmission delay, thereby improving the user experience.

It should be noted that the first OP module 521 and the second OP module 621 each send a message through an XN interface, and the message is encoded using ASN. 1.

Example Three

Figure 22:
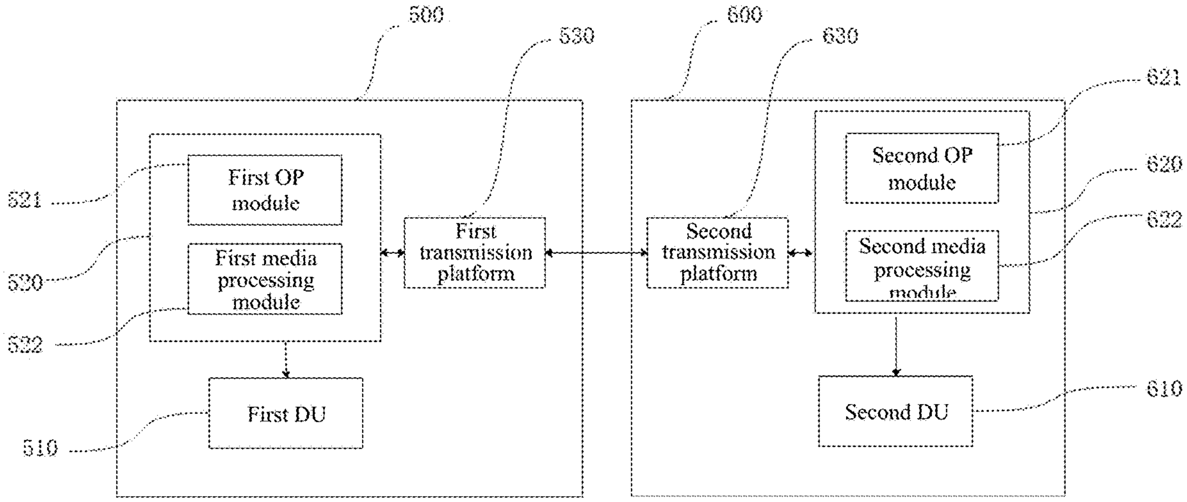
FIG. 22 is a schematic diagram of application of a dual-connectivity configuration including a low-frequency NR base station configured and a high-frequency NR base station for executing a data transmission method, to a non-co-frame deployment scenario according to an example of the present disclosure.

Referring to FIG. 22, it is assumed that the first NR base station is a low-frequency NR base station 500, and the second NR base station is a high-frequency NR base station 600. The low-frequency NR base station 500 includes a first DU 510 and a first CU 520. The high-frequency NR base station 600 includes a second DU 610 and a second CU 620. The first DU 510 is in communication connection with the first CU 520. The second DU 610 is in communication connection with the second CU 620. After receiving a measurement report from a UE, the low-frequency NR base station 500 performs dual-connectivity addition with the high-frequency NR base station 600. First, the low-frequency NR base station 500 creates a first OP module 521. The first OP module 521 is located within the first CU 520. The first OP module 521 acquires a configuration list of the low-frequency NR base station 500 according to low-frequency OAM, determines whether a gNBID and a PLMN of the high-frequency NR base station 600 exist in the configuration list, and if not, determines that the low-frequency NR base station 500 and the high-frequency NR base station 600 are deployed in an inter-station non-co-frame manner. Next, the first OP module 521 configures a first transmission platform 530, and creates a first media processing module 522. The first media processing module 522 is located within the first CU 520, and sends an SN Addition Request message to a second OP module 621 of the high-frequency NR base station 600 through an external network port of the first transmission platform 530. The SN Addition Request message is attached with control signaling carrying an SCTP, sent to an XN interface, and then sent to a second transmission platform 630 of the high-frequency NR base station 600 through the XN interface. The second transmission platform 630 sends the control signaling carrying the SCTP to the second OP module 621. After receiving the control signaling, the second OP module 621 creates a second media processing module 622. The second media processing module 622 is located within the second CU 620 and returns an SN Addition Request Response message to the first OP module 521. The second OP module 621 acquires the SCTP from the control signaling. The second OP module 621 may determine according to the SCTP that the high-frequency NR base station 600 and the low-frequency NR base station 500 are deployed in an inter-station non-co-frame manner. Then, the first OP module 521 and the second OP module 621 may communicate with each other over the SCTP. After the first media processing module 522 receives a data forwarding notification, the first OP module 521 configures an IP address of the second media processing module 622 to the first media processing module 522. Then, the first media processing module 522 directly adds the IP address into a data header of data to be forwarded, which is sent to the second transmission platform 630 through the external network port of the first transmission platform 530, and then sent by the second transmission platform 630 to the second media processing module 622. From the operator's point of view, this example saves physical resources for the operator, to be specific, saves half of SCTP links between transmission resources and IP resources and a 5GC, thereby greatly reducing the maintenance costs of the operator and improving the performance of base stations. From the user's point of view, the use of the dual-master dual-instance scheme and the use of different transmission modes in different deployment scenarios shorten the NR-DC process and the data transmission delay, thereby improving the user experience.

It should be noted that the first OP module 521 and the second OP module 621 each send a message through an XN interface, and the message is encoded using ASN.1.

It should also be noted that there are many ASN.1 encoding formats, such as Basic Encoding Rules (BER), Canonical Encoding Rules (CER), Distinguished Encoding Rules (DER), and so on. BER, CER, and DER are the three most commonly used ASN.1 encoding formats.

It should be noted that in the above three examples, i.e., Example One and Example Two shown in FIG. 21 and Example Three shown in FIG. 22, from the point of view of the equipment vendor, with the setting of different OP modules such as the first OP module 521 and the second OP module 621 on the CU side (the first CU or the second CU), implementations of the first OP module 521 and the second OP module 621 can be directly transplanted in three deployment scenarios: an NR-DC inter-station non-co-frame scenario, an NR-DC co-frame co-logical-station scenario, and an NR-DC co-frame non-co-logical-station scenario. This eliminates the need for redevelopment, the media plane adopts an independent media plane instance, which also do not require redevelopment in the three deployment scenarios, but can be transplanted directly, so the complexity of implementation is greatly reduced. In addition, the same software version can flexibly match the three deployment scenarios, thereby reducing manpower costs and maintenance costs.

It should be noted that in the above three examples, i.e., Example One and Example Two shown in FIG. 21 and Example Three shown in FIG. 22, a frequency range corresponding to the low-frequency NR base station 500 may be 450 MHZ to 6000 MHZ, and a frequency range corresponding to the high-frequency NR base station 600 may be 24250 MHZ to 52600 MHZ, which is not particularly limited herein.

Figure 23:
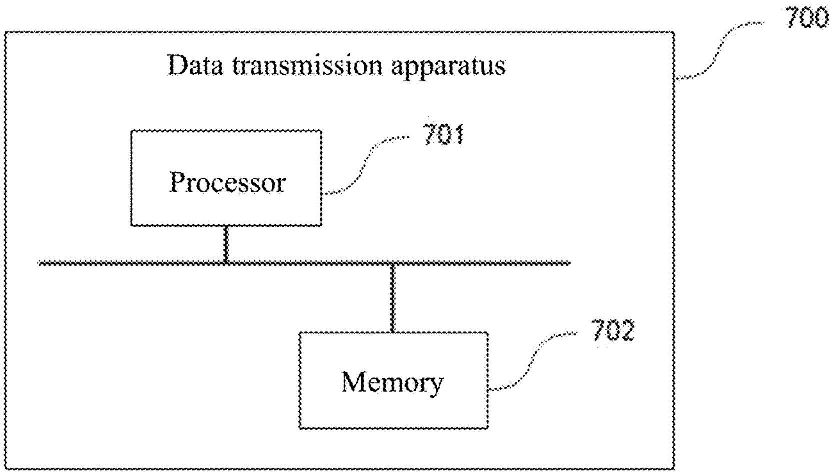
FIG. 23 is a schematic structural diagram of a data transmission apparatus according to an embodiment of the present disclosure.

Further, an embodiment of the present disclosure provides a data transmission apparatus 700. As shown in FIG. 23, the data transmission apparatus 700 includes, but not limited to:

a memory 702, configured for storing a program; and a processor 701, configured for executing the program stored in the memory 702, where the program, when executed by the processor 701, causes the processor 701 to implement the data transmission method described above.

The processor 701 and the memory 702 may be connected by a bus or in other ways.

The memory 702, as a non-transitory computer-readable storage medium, may be configured for storing a non-transitory software program and a non-transitory computer-executable program, for example, the data transmission method described in the embodiments of the present disclosure. The processor 701 runs the non-transitory software program and the non-transitory computer-executable program stored in the memory 702, to implement the data transmission method.

The memory 702 may include a program storage area and a data storage area. The program storage area may store an operating system, and an application required by at least one function. The data storage area may store data and the like required for executing the data transmission method. In addition, the memory 702 may include a high-speed random access memory, and may also include a non-transitory memory, e.g., at least one magnetic disk storage device, flash memory device, or other non-transitory solid-state storage device. In some implementations, the memory 702 may include memories located remotely from the processor 701, and the remote memories may be connected to the processor 701 via a network. Examples of the network include, but not limited to, the Internet, an intranet, a local area network, a mobile communication network, and combinations thereof.

The non-transitory software program and instructions required to implement the data transmission method are stored in the memory 702 which, when executed by one or more processors 701, cause the one or more processors 701 to implement the data transmission method, for example, implement the method steps S110 to S140 in FIG. 6, the method steps S210 to S220 in FIG. 7, the method step S310 in FIG. 8, the method step S410 in FIG. 9, the method steps S510 to S520 in FIG. 10, the method steps S610 to S620 in FIG. 11, the method step S710 in FIG. 12, the method steps S810 to S820 in FIG. 13, the method steps S910 to S940 in FIG. 14, the method step S1010 in FIG. 15, the method step S1110 in FIG. 16, the method step S1210 in FIG. 17, the method steps S1310 to S1320 in FIG. 18, the method steps S1410 to S1420 in FIG. 19, or the method step S1510 in FIG. 20.

The apparatus embodiments or system embodiments described above are merely examples. The units described as separate components may or may not be physically separated, i.e., they may be located in one place or may be distributed over a plurality of network units. Some or all of the modules may be selected according to actual needs to achieve the objects of the scheme of this embodiment.

An embodiment of the present disclosure provides a computer-readable storage medium, storing computer-executable instructions which, when executed by a processor or controller, for example, by a processor in the apparatus embodiment described above, may cause the processor to implement the method steps S110 to S140 in FIG. 6, the method steps S210 to S220 in FIG. 7, the method step S310 in FIG. 8, the method step S410 in FIG. 9, the method steps S510 to S520 in FIG. 10, the method steps S610 to S620 in FIG. 11, the method step S710 in FIG. 12, the method steps S810 to S820 in FIG. 13, the method steps S910 to S940 in FIG. 14, the method step S1010 in FIG. 15, the method step S1110 in FIG. 16, the method step S1210 in FIG. 17, the method steps S1310 to S1320 in FIG. 18, the method steps S1410 to S1420 in FIG. 19, or the method step S1510 in FIG. 20.

In addition, an embodiment of the present disclosure provides a computer program product, including a computer program or computer instructions stored in a computer-readable storage medium. The computer program or the computer instructions, when executed by a processor of a computer device, causes the processor to implement the data transmission method in the above embodiments, for example, implement the method steps S110 to S140 in FIG. 6, the method steps S210 to S220 in FIG. 7, the method step S310 in FIG. 8, the method step S410 in FIG. 9, the method steps S510 to S520 in FIG. 10, the method steps S610 to S620 in FIG. 11, the method step S710 in FIG. 12, the method steps S810 to S820 in FIG. 13, the method steps S910 to S940 in FIG. 14, the method step S1010 in FIG. 15, the method step S1110 in FIG. 16, the method step S1210 in FIG. 17, the method steps S1310 to S1320 in FIG. 18, the method steps S1410 to S1420 in FIG. 19, or the method step S1510 in FIG. 20.

An embodiment of the present disclosure includes: controlling a first OP module to create a first media processing module; acquiring second identification information of a second NR base station, and determining a deployment mode between the first NR base station and the second NR base station according to the second identification information, where a second OP module is configured in the second NR base station; generating target identification information according to the deployment mode, generating control signaling according to the target identification information, and sending the control signaling to the second NR base station, such that the second OP module creates a second media processing module according to the control signaling; and controlling, according to the deployment mode, the first media processing module to transmit data to the second media processing module. The schemes of the embodiments of the present disclosure may include: determining a deployment mode between a first NR base station and a second NR base station according to second identification information; then generating target identification information according to the deployment mode; generating control signaling according to the target identification information; sending the control signaling carrying the target indication information to the second NR base station, such that a second OP module of the second NR base station creates a second media processing module according to the target identification information in the control signaling; and finally controls a first media processing module to transmit data to the second media processing module according to the deployment mode. That is to say, in the schemes of the embodiments of the present disclosure, the first OP module of the first NR base station creates the first media processing module and the second OP module of the second NR base station creates the second media processing module, such that in different deployment modes, the first OP module and the second OP module can interact with each other, and the first media processing module and the second media processing module can also interact with each other. In this way, the data transmission can be realized while ignoring the implementation differences and transmission differences between different deployment scenarios of NR-DC, thereby reducing the complexity of implementation by equipment manufacturers and the complexity of version upgrade by operators.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited to the implementations described above. Those having ordinary skills in the art can make various equivalent modifications or replacements without departing from the essence of the present disclosure. Such equivalent modifications or replacements fall within the scope defined by the claims of the present disclosure.

What is claimed is:

1. A data transmission method for New Radio-Dual Connectivity (NR-DC) between a first New Radio (NR) base station and a second NR base station, the data transmission method being performed by the first NR base station, wherein a first Operation Process (OP) module is configured in the first NR base station, the data transmission method comprising:

controlling the first OP module to create a first media processing module;

acquiring second identification information of the second NR base station, and determining a deployment mode between the first NR base station and the second NR base station according to the second identification information, wherein a second OP module is configured in the second NR base station;

generating target identification information according to the deployment mode, generating control signaling according to the target identification information, and sending the control signaling to the second NR base station, such that the second OP module creates a second media processing module according to the control signaling; and controlling, according to the deployment mode, the first media processing module to transmit data to the second media processing module.

2. The data transmission method of claim 1, wherein determining a deployment mode between the first NR base station and the second NR base station according to the second identification information comprises:

acquiring a configuration list and determining whether the second identification information exists in the configuration list; and in response to existence of the second identification information in the configuration list, acquiring first identification information of the first NR base station, comparing the first identification information with the second identification information, and determining the deployment mode between the first NR base station and the second NR base station according to a result of the comparison.

3. The data transmission method of claim 2, wherein determining the deployment mode between the first NR base station and the second NR base station according to a result of the comparison comprises:

determining that the deployment mode between the first NR base station and the second NR base station is co-frame co-logical-station deployment, in response to the first identification information being consistent with the second identification information; or determining that the deployment mode between the first NR base station and the second NR base station is co-frame non-co-logical-station deployment, in response to the first identification information being not consistent with the second identification information.

4. The data transmission method of claim 1, wherein in response to determining that the deployment mode between the first NR base station and the second NR base station is co-frame co-logical-station deployment, controlling, according to the deployment mode, the first media processing module to transmit data to the second media processing module comprises:

configuring an Internet Protocol (IP) address and a Media Access Control (MAC) address of the second media processing module to the first media processing module; and controlling, according to the IP address and the MAC address of the second media processing module, the first media processing module to transmit the data to the second media processing module.

5. The data transmission method of claim 1, wherein in response to determining that the deployment mode between the first NR base station and the second NR base station is co-frame non-co-logical-station deployment, controlling, according to the deployment mode, the first media processing module to transmit data to the second media processing module comprises:

controlling the first OP module to create a first transmission platform; and controlling the first media processing module to transmit the data to the second media processing module through an internal network port of the first transmission platform.

6. The data transmission method of claim 2, wherein determining a deployment mode between the first NR base station and the second NR base station according to the second identification information further comprises:

determining that the deployment mode between the first NR base station and the second NR base station is inter-station non-co-frame deployment, in response to absence of the second identification information in the configuration list.

7. The data transmission method of claim 6, wherein in response to determining that the deployment mode between the first NR base station and the second NR base station is inter-station non-co-frame deployment, controlling, according to the deployment mode, the first media processing module to transmit data to the second media processing module comprises:

controlling the first OP module to create a first transmission platform; and controlling the first media processing module to transmit the data to a second transmission platform of the second NR base station through an external network port of the first transmission platform, such that transmitting the data to the second media processing module through the second transmission platform.

8. The data transmission method of claim 2, wherein in response to determining that the deployment mode between the first NR base station and the second NR base station is co-frame co-logical-station deployment, controlling, according to the deployment mode, the first media processing module to transmit data to the second media processing module comprises:

configuring an Internet Protocol (IP) address and a Media Access Control (MAC) address of the second media processing module to the first media processing module; and controlling, according to the IP address and the MAC address of the second media processing module, the first media processing module to transmit the data to the second media processing module.

9. The data transmission method of claim 3, wherein in response to determining that the deployment mode between the first NR base station and the second NR base station is co-frame co-logical-station deployment, controlling, according to the deployment mode, the first media processing module to transmit data to the second media processing module comprises:

configuring an Internet Protocol (IP) address and a Media Access Control (MAC) address of the second media processing module to the first media processing module; and controlling, according to the IP address and the MAC address of the second media processing module, the first media processing module to transmit the data to the second media processing module.

10. The data transmission method of claim 2, wherein in response to determining that the deployment mode between the first NR base station and the second NR base station is co-frame non-co-logical-station deployment, controlling, according to the deployment mode, the first media processing module to transmit data to the second media processing module comprises:

controlling the first OP module to create a first transmission platform; and controlling the first media processing module to transmit the data to the second media processing module through an internal network port of the first transmission platform.

11. The data transmission method of claim 3, wherein in response to determining that the deployment mode between the first NR base station and the second NR base station is co-frame non-co-logical-station deployment, controlling, according to the deployment mode, the first media processing module to transmit data to the second media processing module comprises:

controlling the first OP module to create a first transmission platform; and controlling the first media processing module to transmit the data to the second media processing module through an internal network port of the first transmission platform.

12. A data transmission method for New Radio-Dual Connectivity (NR-DC) between a first New Radio (NR) base station and a second NR base station, the data transmission method being performed by the second NR base station, the data transmission method comprising:

receiving control signaling sent by the first NR base station, wherein the control signaling carries target identification information, and the target identification information is generated by the first NR base station according to a deployment mode between the first NR base station and the second NR base station;

creating a second media processing module according to the control signaling;

determining the deployment mode between the second NR base station and the first NR base station according to the target identification information; and controlling, according to the deployment mode, the second media processing module to perform data distributing.

13. The data transmission method of claim 12, wherein the target identification information comprises a Stream Control Transmission Protocol (SCTP), a virtual SCTP (vSCTP), or identification information of the first Operation Process (OP) module of the first NR base station, and determining the deployment mode between the second NR base station and the first NR base station according to the target identification information comprises at least one of:

determining that the deployment mode between the second NR base station and the first NR base station is inter-station non-co-frame deployment, in response to the target identification information being the SCTP; or determining that the deployment mode between the second NR base station and the first NR base station is co-frame non-co-logical-station deployment, in response to the target identification information being the vSCTP; or determining that the deployment mode between the second NR base station and the first NR base station is co-frame co-logical-station deployment, in response to the target identification information being the identification information of the first OP module of the first NR base station.

14. The data transmission method of claim 13, wherein in response to the deployment mode being inter-station non-co-frame deployment, controlling, according to the deployment mode, the second media processing module to perform data distributing comprises:

controlling a second OP module to create a second transmission platform; and controlling the second media processing module to perform the data distributing through an external network port of the second transmission platform.

15. The data transmission method of claim 13, wherein in response to the deployment mode being co-frame co-logical-station deployment, controlling, according to the deployment mode, the second media processing module to perform data distributing comprises:

configuring, to the second media processing module, a destination Internet Protocol (IP) address and a destination Media Access Control (MAC) address for data distributing; and controlling, according to the destination IP address and the destination MAC address, the second media processing module to perform the data distributing.

16. The data transmission method of claim 13, wherein in response to the deployment mode being co-frame non-co-logical-station deployment, controlling, according to the deployment mode, the second media processing module to perform data distributing comprises:

controlling the second media processing module to perform the data distributing through an internal network port of a first transmission platform of the first NR base station.

17. A data transmission apparatus, comprising:

a memory, a processor, and a computer program stored in the memory and executable by the processor, wherein the computer program, when executed by the processor, causes the processor to perform a data transmission method for New Radio-Dual Connectivity (NR-DC) between a first New Radio (NR) base station and a second NR base station, the data transmission method being performed by the first NR base station, wherein a first Operation Process (OP) module is configured in the first NR base station, the data transmission method comprising:

controlling the first OP module to create a first media processing module;

acquiring second identification information of the second NR base station, and determining a deployment mode between the first NR base station and the second NR base station according to the second identification information, wherein a second OP module is configured in the second NR base station;

generating target identification information according to the deployment mode, generating control signaling according to the target identification information, and sending the control signaling to the second NR base station, such that the second OP module creates a second media processing module according to the control signaling; and controlling, according to the deployment mode, the first media processing module to transmit data to the second media processing module.

18. The data transmission apparatus of claim 17, wherein determining a deployment mode between the first NR base station and the second NR base station according to the second identification information comprises:

acquiring a configuration list and determining whether the second identification information exists in the configuration list; and in response to existence of the second identification information in the configuration list, acquiring first identification information of the first NR base station, comparing the first identification information with the second identification information, and determining the deployment mode between the first NR base station and the second NR base station according to a result of the comparison.

19. A non-transitory computer-readable storage medium, storing computer-executable instructions which, when executed by a processor, causes the processor to perform the data transmission method of claim 1.

20. A computer program product, comprising a computer program or computer instructions stored in a non-transitory computer-readable storage medium, wherein the computer program or the computer instructions, when executed by a processor of a computer device, causes the computer device to perform the data transmission method of claim 1.

* * * * *